United States Patent [19]

Schweighofer et al.

[11] Patent Number: 4,904,390

[45] Date of Patent: Feb. 27, 1990

[54] METHOD FOR VARYING THE CAPACITY OF AN ION EXCHANGER FOR A SPECIFIC CHEMICAL ELEMENT

[75] Inventors: Werner Schweighofer, Erlangen; Christian M. Z. Schwabedissen, Herzogenaurach; Brigitte Siewert-Posielek, Leinburg; Karl Habeck, Neustadt/Aisch; Klaus Seifert, Schwebheim, all of Fed. Rep. of Germany

[73] Assignee: Siemens Aktiengesellschaft, Munich, Fed. Rep. of Germany

[21] Appl. No.: 177,180

[22] Filed: Apr. 4, 1988

[30] Foreign Application Priority Data

Apr. 2, 1987 [DE] Fed. Rep. of Germany ....... 3711018

[51] Int. Cl.⁴ .......................... B01D 15/04; C02F 1/42
[52] U.S. Cl. .................................... 210/664; 210/668; 210/669; 210/673; 210/681; 210/688
[58] Field of Search ............... 210/663, 664, 668, 669, 210/670, 673, 681, 688; 423/617

[56] References Cited

U.S. PATENT DOCUMENTS 4,046,688 9/1977 Cunningham et al. ............. 423/617

Primary Examiner—Ivars Cintins
Attorney, Agent, or Firm—Herbert L. Lerner; Laurence A. Greenberg

[57] ABSTRACT

A method for varying the capacity for a specific chemical element of an ion exchanger used for cleaning a liquid from a loop includes varying the chemical status of the element in the liquid to be cleaned immediately upstream of the ion exchanger by adding given substances. The given substances added are removed immediately downstream of the ion exchanger. The chemical element may be antimony, the loop may be the primary loop of a pressurized water reactor plant and the liquid may be primary coolant.

15 Claims, 1 Drawing Sheet

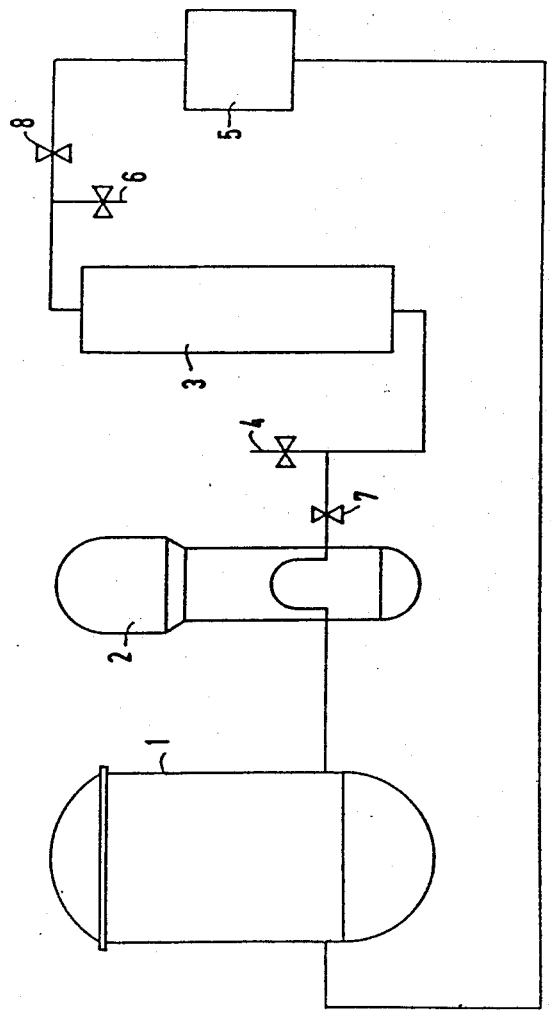

METHOD FOR VARYING THE CAPACITY OF AN ION EXCHANGER FOR A SPECIFIC CHEMICAL ELEMENT

The invention relates to a method for varying the capacity of ion exchangers for specific chemical elements, including antimony, especially by ion exchanger used for cleaning the primary coolant water from the primary loop of a pressurized water reactor plant.

The capacity (absorbency) of an ion exchanger for a specific element depends, among other factors, on the chemical status or valence of this element in the medium to be cleaned. In the primary coolant of a pressurized water reactor plant, the chemical status of antimony is such that the capacity of an ion exchanger in the primary loop for antimony is very low. An increase in the capacity attained through a volumetric increase of the ion exchanger in the primary loop would have to be very great, because of this very low capacity. Such large ion exchangers, or a combination of ion exchangers, require too much space and are also uneconomical. A further consideration is that previously, regeneration of the ion exchanger resins after use in the primary loop of a pressurized water reactor has not been provided. Consequently, the use of relatively large ion exchangers would increase the consumption of resins to such an extent that the costs and labor involved in storage and disposal of the resins would be excessively high.

A stringent removal of antimony from the primary coolant of pressurized water reactor plants was, therefore, not performed heretofore.

It is accordingly an object of the invention to provide a method for varying or increasing the capacity of an ion exchanger for a specific chemical element, which overcomes the hereinafore-mentioned disadvantages of the heretofore-known methods of this general type and which does so without increasing the volume of the ion exchanger and without intervening in the chemistry of the primary water flowing through the reactor.

With the foregoing and other objects in view there is provided, in accordance with the invention, a method for varying the capacity for antimony of an ion exchanger used for cleaning primary coolant from the primary loop of a pressurized water reactor plant, which comprises varying the chemical valence valence of the antimony in the primary coolant to be cleaned immediately upstream of the ion exchanger by adding given substances that after the valence, and removing the given substances added immediately downstream of the ion exchanger. With the objects of the invention in view, there is also provided a method for varying the capacity for a specific chemical elements of an ion exchanger used for cleaning liquids which comprises varying the chemical valent status of the element in the liquid to be cleaned immediately upstream of the ion exchanger by adding specific valence altering substances, and then removing such added substances immediately downstream of the ion exchanger.

The chemical status of the elements in the primary coolant of a pressurized water reactor is dictated by coolant parameters, which are selected in such as way as to assure optimal operational safety. It is accordingly not possible to change these coolant parameters. With the method according to the invention, the coolant that flows through the reactor remains unchanged. On the other hand, in accordance with the invention, actions are intentionally taken upstream of the ion exchanger that intentionally affect the chemical valent status of the element to be removed. This changes and increases the capacity of the ion exchanger for the specific element. In order to ensure that the actions necessary for changing the chemical status of the element, which may include the addition of chemicals, will not be harmful to the reactor, the actions are rescinded again immediately downstream of the ion exchanger. Substances that have been added are, for instance, removed from the liquid. According to the invention, the chemistry of the coolant is only intentionally changed for its flow through the ion exchanger. All of the changes are immediately rescinded downstream of the ion exchanger. In the major portion of the primary loop, in particular in the reactor, primary coolant that has been unchanged by the action according to the invention continues to flow.

An advantage attained through the use of the invention is that the capacity of an ion exchanger for a specific chemical element, in particular antimony, is increased, while the quality of the cooling of the reactor remains unchanged, to such an extent that an economical advantage is provided by requiring only a single commercially available ion exchanger for virtually complete removal of the antimony.

In accordance with another mode of the invention, there is provided a method which comprises raising the redox potential of a chemical element in the liquid to be cleaned immediately upstream of the ion exchanger in order to increase the capacity of the ion exchanger for the chemical element.

It is thus seen that in order to enable an ion exchanger to absorb more of a specific chemical element, the redox potential of this element is increased, for instance. This is done in the liquid to be cleaned immediately upstream of the ion exchanger. The redox potential is the electrical potential of the element, measured with respect to a reference electrode.

In accordance with a further mode of the invention, there is provided a method which comprises making antimony pentavalent immediately upstream of the ion exchanger in order to increase the capacity of the ion exchanger for antimony. The capacity of an ion exchanger for pentavalent antimony is considerably greater than its capacity for antimony having the usual chemical statis i.e. trivalent antimony.

The advantage achieved by increasing the redox potential is that a relatively small, inexpensive ion exchanger is sufficient for retaining the antimony.

In accordance with an added mode of the invention, there is provided a method which comprises adding oxygen, for example, to the liquid to be cleaned immediately upstream of the ion exchanger and removing the oxygen immediately downstream of the ion exchanger in order to vary the valence and the redox potential of antimony.

In accordance with an additional mode of the invention, there is provided a method which comprises adding hydrogen peroxide to the liquid to be cleaned immediately upstream of the ion exchanger and removing the hydrogen peroxide immediately downstream of the ion exchanger in order to initially vary by raising the valence and the redox potential of antimony for greater absorption and then returning the liquid to its original redox potential.

Oxygen or hydrogen peroxide are chemicals suitable for converting antimony to its pentavalent form, and as a result a considerably greater quantity of antimony can be bound in the ion exchanger.

In order to ensure that the chemicals which are added, such as oxygen or hydrogen peroxide, will not impair the properties of the primary coolant when the method according to the invention is used in the primary loop of a pressurized water reactor, the added substance, oxygen is removed again from the loop downstream of the ion exchanger.

In accordance with yet another mode of the invention, there is provided a method which comprises carrying out the step of removing the oxygen again downstream of the ion exchanger in a degasser.

The method using an apparatus for admixing oxygen, in other words the ion exchanger and the degasser, for example, has no deleterious effects upon the primary coolant that is to be cleaned.

The method according to the invention for varying the capacity of an ion exchanger for a specific chemical element can also be used for reducing the capacity of the ion exchanger for the sake of selective regeneration. Therefore, in accordance with yet a further mode of the invention, there is provided a method which comprises varying the chemical status of a specific multivalent chemical element, especially antimony, in the ion exchanger in order to reduce the capacity of the ion exchanger for the sake of selective regeneration of the ion exchanger saturated with the element, especially antimony. Thus the chemical valence status of this element is changed once again so that it will no longer be retained in the ion exchanger.

In accordance with yet an added mode of the invention, there is provided a method which comprises reducing the redox potential of the chemical element in the ion exchanger in order to selectively regenerate the ion exchanger.

In accordance with yet an additional mode of the invention, there is provided a method which comprises returning the antimony in the ion exchanger to its original valence trivalent antimony in order to selectively regenerate the ion exchanger for antimony.

Only a very low capacity of the ion exchanger is present for this trivalent form of antimony and therefore the antimony is flushed out of the ion exchanger.

For regeneration, the ion exchanger is separated from the loop of the liquid to be cleaned, which may be the primary loop of a pressurized water reactor. During the selective regeneration, however, primary coolant is sent through the ion exchanger as a flushing fluid.

In accordance with still another mode of the invention, there is provided a method which comprises adding hydrogen or hydrazine to the liquid upstream, or immediately upstream, of the ion exchanger, subsequently sending the liquid through the ion exchanger, and subsequently removing the liquid downstream of the ion exchanger, in order to establish the original reduced valence of the antimony. This is done in order to lower the redox potential of the antimony contained in the ion exchanger.

In accordance with a concomitant mode of the invention, there is provided a method which comprises sending the primary coolant through the ion exchanger as a flushing liquid during the selective regeneration.

Through the use of the selective regeneration of the ion exchanger according to the invention, the ion exchanger can often be used with only short servicing periods, in order to ensure that labor and costs for new ion exchanger resins and for disposing of used resins is kept low.

The particular advantage attained in accordance with the invention is that antimony is nearly completely removed from a liquid to be cleaned, in particular the primary coolant of a pressurized water reactor, with a chemical method that only uses inexpensive chemicals. A commercially available, relatively small ion exchanger is sufficient to accomplish this. The ion exchanger can be used more than once with unvarying reliability, because the method according to the invention also includes a selective removal of antimony from the ion exchanger by intermittently lowering the capacity of the ion exchanger for antimony. In other words, comprehensive removal of antimony from the primary coolant of a pressurized water reactor plant is made possible for the first time with the present invention.

Other features which are considered as characteristic for the invention are set forth in the appended claims.

Although the invention is illustrated and described herein as embodied in a method for varying the capacity of an ion exchanger for any specific variable valent chemical element, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific embodiments when read in connection with the accompanying drawing.

The drawing is a diagrammatic, schematic and block circuit diagram of a primary loop of a pressurized water reactor along with an ion exchanger and devices for varying the capacity of the ion exchanger.

Referring now to the single FIGURE of the drawing in detail, there is seen a reactor 1 and a steam generator 2, shown in simplified form, which are disposed in the primary loop of a pressurized water reactor. An ion exchanger 3 for cleaning the primary coolant is also located in the primary loop. The ion exchanger 3 communicates with a supply line 4 that can be shut off. A degasser 5 is disposed in series with the ion exchanger 3 in the primary loop.

In order to ensure that any antimony located in the primary loop will be absorbed in the ion exchanger 3 in accordance with the method of the invention, oxygen is supplied to the ion exchanger 3 through the supply line 4. Due to the admixture of oxygen, antimony is made pentavalent and is thereby bound in the ion exchanger 3. The oxygen is once again removed from the primary coolant in the degasser 5. Once the ion exchanger 3 is saturated with antimony, a selective regeneration is performed according to the invention. To this end, while the primary coolant is flowing through another non-illustrated ion exchanger, hydrogen is supplied to the ion exchanger 3 through the supply line 4. At the same time, water is fed into the ion exchanger 3 either through the supply line 4 or from the primary loop. A first shutoff device 7 disposed in the primary loop upstream of the opening of the supply line 4 is closed either completely or partially. An outlet line 6 for the liquid flowing out in the regeneration process branches off from the primary loop downstream of the ion exchanger 3 and upstream of a second shutoff device 8. The outlet line 6 can be shut off for the cleaning operation. The original trivalence of the antimony is reestablished by adding hydrogen. However, for antimony of this valence, the capacity of the ion exchanger 3 is so low that the antimony is given up or elated by the ion exchanger 3.

The foregoing is a description corresponding in substance to German Application No. P 37 11 018.7, dated Apr. 2, 1987, the International priority of which is being claimed for the instant application, and which is hereby made part of this application. Any material discrepancies between the foregoing specification and the aforementioned corresponding German application are to be resolved in favor of the latter.

We claim:

1. A method for varying the capacity for antimony of an ion exchanger used for absorbing antimony from the primary coolant of the primary loop of a pressurized-water reactor plant, the ion exchanger having different capacities for different valences of antimony, which method comprises the steps of varying the valence of the antimony in the primary coolant from which it is to be absorbed immediately upstream of the ion exchanger positioned in the primary coolant loop by adding redox substances to the primary coolant for converting the antimony to a valence form for which the ion exchanger has a greater capacity than for the antimony in its original state, passing the coolant through the ion exchanger to remove the antimony, and then removing the remaining added redox substances from the primary coolant immediately downstream from the ion exchanger.

2. The method according to claim 1, which comprises making antimony pentavalent immediately upstream of the ion exchanger in order to increase the capacity of the ion exchanger for antimony.

3. The method according to claim 2, which comprises adding oxygen to the primary coolant immediately upstream of the ion exchanger and removing the oxygen from the primary coolant, immediately downstream of the ion exchanger in order to vary the valence and the redox potential of antimony.

4. The method according to claim 3 which comprises carrying out the step of removing the excess oxygen downstream of the ion exchanger in a degasser.

5. The method according to claim 2, which comprises adding hydrogen peroxide to the primary coolant immediately upstream of the ion exchanger and removing the hydrogen peroxide from the primary coolant immediately downstream of the ion exchanger in order to vary the valence and the redox potential of antimony.

6. The method according to claim 1, further comprising regenerating the ion exchanger saturated with antimony by the steps of reducing the valence of antimony absorbed in the ion exchanger for converting the antimony to a valence for which the ion exchanger has a lower capacity than for the antimony in the state from which it was absorbed by the ion exchanger and then, eluting the thus converted antimony from said ion exchanger.

7. The method according to claim 6, which comprises returning the antimony in the ion exchanger to its original trivalence in order to regenerate the ion exchanger for antimony.

8. The method according to claim 6, wherein the step of reducing the valence of antimony absorbed in the ion exchanger comprises adding hydrogen to a liquid upstream of the ion exchanger, subsequently sending the liquid through the ion exchanger, whereby the original valence of the antimony is reestablished, and subsequently removing the hydrogen from the liquid downstream of the ion exchanger.

9. The method according to claim 8, which comprises sending primary coolant through the ion exchanger as a flushing liquid after the hydrogen reduction during the regeneration phase.

10. The method according to claim 6, wherein the step of reducing the valence of antimony absorbed in the ion exchanger comprises adding hydrazine to a liquid upstream of the ion exchanger, subsequently sending the liquid through the ion exchanger, whereby the original valence of the antimony is reestablished, and subsequently removing the hydrazine from the liquid downstream of the ion exchanger.

11. The method according to claim 10, which comprises sending primary coolant through the ion exchanger as a flushing liquid after the hydrazine reduction during the regeneration phase.

12. A method for varying the capacity of an ion exchanger used for absorbing a specific variety of valent chemical element from a liquid said specific chemical element existing in more than one chemical form, said ion exchanger having different capacities for different valences of said specific chemical element, which method comprises the steps of varying the chemical valence form of the chemical element in the liquid from which it is to be absorbed immediately upstream of said ion exchanger by adding redox substances to said liquid for converting said chemical element to a valence form for which the ion exchanger has a greater capacity than for this chemical element in its original state, then passing said liquid through said ion exchanger to remove said element, and then removing said adding redox substances from the liquid immediately downstream from the ion exchanger.

13. The method according to claim 12, which comprises raising the redox potential of the specific chemical element in the liquid immediately upstream of the ion exchanger in order to increase the capacity of the ion exchanger for the specific element.

14. The method according to claim 12, further comprising regenerating the ion exchanger saturated with said element by the steps of changing the valence of said specific element absorbed on the ion exchanger by converting said specific chemical element to a valence for which the ion exchanger has a lower capacity than for the valence state in which said element was absorbed on said ion exchanger and then eluting said specific element from the ion exchanger.

15. The method according to claim 14, wherein the step of changing the valence of the specific element absorbed on the ion exchanger comprises reducing the redox potential of the absorbed chemical element during the regeneration of the ion exchanger.

* * * * *